United States Patent [19]

Niemiec et al.

[11] Patent Number: 5,261,796
[45] Date of Patent: Nov. 16, 1993

[54] ELECTRIC-MOTOR IN-LINE INTEGRATED HYDRAULIC PUMP

[75] Inventors: Albin J. Niemiec, Sterling Heights; James V. Bloomquist, Bloomfield Hills; William E. Sargo, Royal Oak, all of Mich.

[73] Assignee: Vickers, Incorporated, Troy, Mich.

[21] Appl. No.: 982,729

[22] Filed: Nov. 27, 1992

Related U.S. Application Data

[63] Continuation-in-part of Ser. No. 867,389, Apr. 13, 1992, which is a continuation-in-part of Ser. No. 787,670, Nov. 4, 1991, which is a continuation-in-part of Ser. No. 687,173, Apr. 18, 1991, Pat. No. 5,181,837.

[51] Int. Cl.$^5$ ............................................. F04B 39/06
[52] U.S. Cl. ................................. 417/371; 417/366; 417/203
[58] Field of Search .............. 418/212; 417/371, 366, 417/410, 357, 203

[56] References Cited

U.S. PATENT DOCUMENTS

| | | | |
|---|---|---|---|
| 1,927,799 | 9/1933 | Mann | 417/203 |
| 1,967,034 | 7/1934 | Lipman | 417/410 |
| 2,312,519 | 3/1943 | Zimmerer | 417/410 B |
| 2,312,886 | 3/1943 | Ellinwood | 418/212 |
| 2,409,477 | 10/1976 | Lancey | 417/199.1 |
| 3,434,656 | 3/1969 | Bellmer | 417/371 |
| 4,551,079 | 11/1985 | Kain | 418/212 |
| 4,971,529 | 11/1990 | Gannaway | 418/212 |
| 4,971,535 | 11/1990 | Okada | 418/212 |
| 5,145,335 | 9/1992 | Abelen et al. | 417/410 B |

Primary Examiner—Richard A. Bertsch
Assistant Examiner—Peter Korytnyk
Attorney, Agent, or Firm—Barnes, Kisselle, Raisch, Choate, Whittemore & Hulbert

[57] ABSTRACT

An integrated in-line electric motor/hydraulic pump that includes a pump housing having a pair of end members mounted at opposed ends of the housing. An electric motor includes a rotor on a shaft journalled between the end members and a stator surrounding the rotor within the housing. A pump inlet opens into the interior of the housing. First and second vane pump cartridges are integrated into one of the end members. Each vane pump cartridge includes a rotor coupled to the shaft, and a plurality of vane carried by the rotor to engage a vane cam ring that surrounds the rotor, which defines at least one pumping cavity between the cam ring and the rotor. A vane pump inlet passage within the one end member extends between and operatively couples the housing interior to the pumping cavities of both the first and second vane pump cartridges for feeding fluid from the housing interior to both cartridges in parallel. A vane pump discharge is also carried by the one end member and operatively coupled to both of the pumping cavities in parallel.

18 Claims, 6 Drawing Sheets

ELECTRIC-MOTOR IN-LINE INTEGRATED HYDRAULIC PUMP

The present application is a continuation-in-part of application Ser. No. 07/867,389 filed Apr. 13, 1992, still pending, which is a continuation-in-part of application Ser. No. 07/787,670 filed Nov. 4, 1991, still pending which is a continuation-in-part of application Ser. No. 07/687,173 filed Apr. 18, 1991 now U.S. Pat. No. 5,181,837.

The present invention is directed to integrated electric-motor hydraulic pump assemblies, and more particularly to an integrated motor and pump having a vane pump cartridge in one of the unit end members.

BACKGROUND AND OBJECTS OF THE INVENTION

In hydraulic pumps that are driven by an electric motor, it has been common practice to provide the electric motor in one housing and the hydraulic pump in another housing, with the two housings positioned in-line. The motor and pump have their own sets of bearings and shafts that are usually engaged through internal and external splines or through flexible couplings. Such an arrangement is axially long, and necessitates the use of mounting brackets and alignment guides.

U.S. Pat. No. 4,729,717 discloses an electric-motor in-line hydraulic pump that comprises a common housing, a stationary shaft mounted in the housing, and spaced piston-type cylinder block subassemblies that rotate around and are mounted on the shaft. Each cylinder block has a plurality of circumferentially spaced pistons. The cylinder block subassemblies are positioned so that the pistons of one subassembly extend toward the other subassembly. A common yoke plate is mounted between the two cylinder blocks and bears the two groups of piston shoes, one on each of its two bearing surfaces. Each cylinder block is driven independently of and in a direction opposite to the other by an electric motor integrally mounted such that its hollow rotor houses and drives the block. All components described above are contained in one housing and operate submerged in hydraulic fluid.

U.S. application Ser. No. 07/687,173 discloses a electric-motor in-line hydraulic apparatus that comprises a housing having end members closing the housing, an electric motor stator mounted in the housing, an electric motor rotor, a shaft on which the rotor is mounted journalled in the housing, and a pump integrally formed within one or both of the end members. The shaft extends through an opening in the end member and is connected to the rotating group of the pump. Hydraulic fluid is supplied to the interior of the electric motor housing and flows through passages in the housing to the intake of the pump integral with the end member. The end member associated with the pump is formed with an enlarged chamber adjacent to the inlet of the pump that functions to reduce the flow velocity and to permit the separated air to dissolve back into solution with the hydraulic fluid, thereby reducing the operating sound level of the pump. Application Ser. No. 07/787,670 filed Nov. 4, 1991 discloses in-line electric-motor pumps of similar character in which the pump mechanism comprises a piston pump, a vane pump, a gear pump or combinations thereof.

It is a general object of the present invention to provide an integrated electric-motor and vane-type hydraulic pump that includes a double vane pump in one or both of the housing end members, with inlet and discharge passages to both pumps being disposed entirely within the associated end member. A more specific object of the present invention is to provide an integrated pump of the described character in which each double vane pump comprises a pair of vane pump cartridges sandwiched between elements that form the associated housing end member, and in which the inlet passages to both pump cartridges are disposed within the associated end member and connect the cartridges in parallel with the housing interior without requiring connections or lines external to the housing.

SUMMARY OF THE INVENTION

An integrated in-line electric motor/hydraulic pump in accordance with the present invention comprises a pump housing having a pair of end members mounted at opposed ends of the housing. An electric motor includes a rotor on a shaft journalled between the end members and a stator surrounding the rotor within the housing. A pump inlet opens into the interior of the housing. First and second vane pump cartridges are integrated into one of the end members. Each vane pump cartridge includes a rotor coupled to the shaft, and a plurality of vane carried by the rotor to engage a vane cam ring that surrounds the rotor, which defines at least one pumping cavity between the cam ring and the rotor. A vane pump inlet passage within the one end member extends between and operatively couples the housing interior to the pumping cavities of both the first and second vane pump cartridges for feeding fluid from the housing interior to both cartridges in parallel. A vane pump discharge is also carried by the one end member and operatively coupled to both of the pumping cavities in parallel.

In the preferred embodiments of the invention, the two vane pump cartridges comprise dual-lobe vane pump cartridges in which the cam ring and rotor define diametrically opposed arcuate pumping cavities. The inlet and discharge passages are operatively coupled to both cavities in each cartridge, and preferably take the form of diametrically opposed symmetrical pairs of inlet and outlet kidney-shaped ports coupled to the respective cavities. The one end member comprises three elements fastened to each other and to the pump housing so that the first vane pump cartridge is captured between the first element and an internal wall in the second element, while the second vane pump cartridge is captured between the internal wall of the second element and the third element. Each vane pump cartridge includes a pair of side plates that contain the inlet and discharge ports which connect the inlet and discharge passages to the pumping cavities. The discharge passages comprise separate discharge openings in the end member. Enlarged volume chambers are located at the pump cavities in the common housing end member of the pump and electric motor to dampen discharge pressure pulsations.

The pump inlet in one embodiment of the invention comprises an inlet opening in the end member opposed to that which contains the two vane pump cartridges, and preferably includes an impeller coupled to the motor shaft for boosting fluid pressure at the pump inlet fed to the interior of the pump housing. In a second embodiment, the pump inlet is disposed in the housing itself, and at least one additional vane pump cartridge is disposed in the other end member and coupled to the pump shaft. In each embodiment, the hydraulic fluid thus flows through the housing past the rotor and stator, cooling the motor components and increasing the horsepower capability as compared with conventional air-cooled drive motors. Since the electric motor and all pumping elements are integrated, the number of possible fluid leakage sources is reduced. The electric motor operates at reduced sound level, and the close couplings between the motor and pumps reduces the number of required parts.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
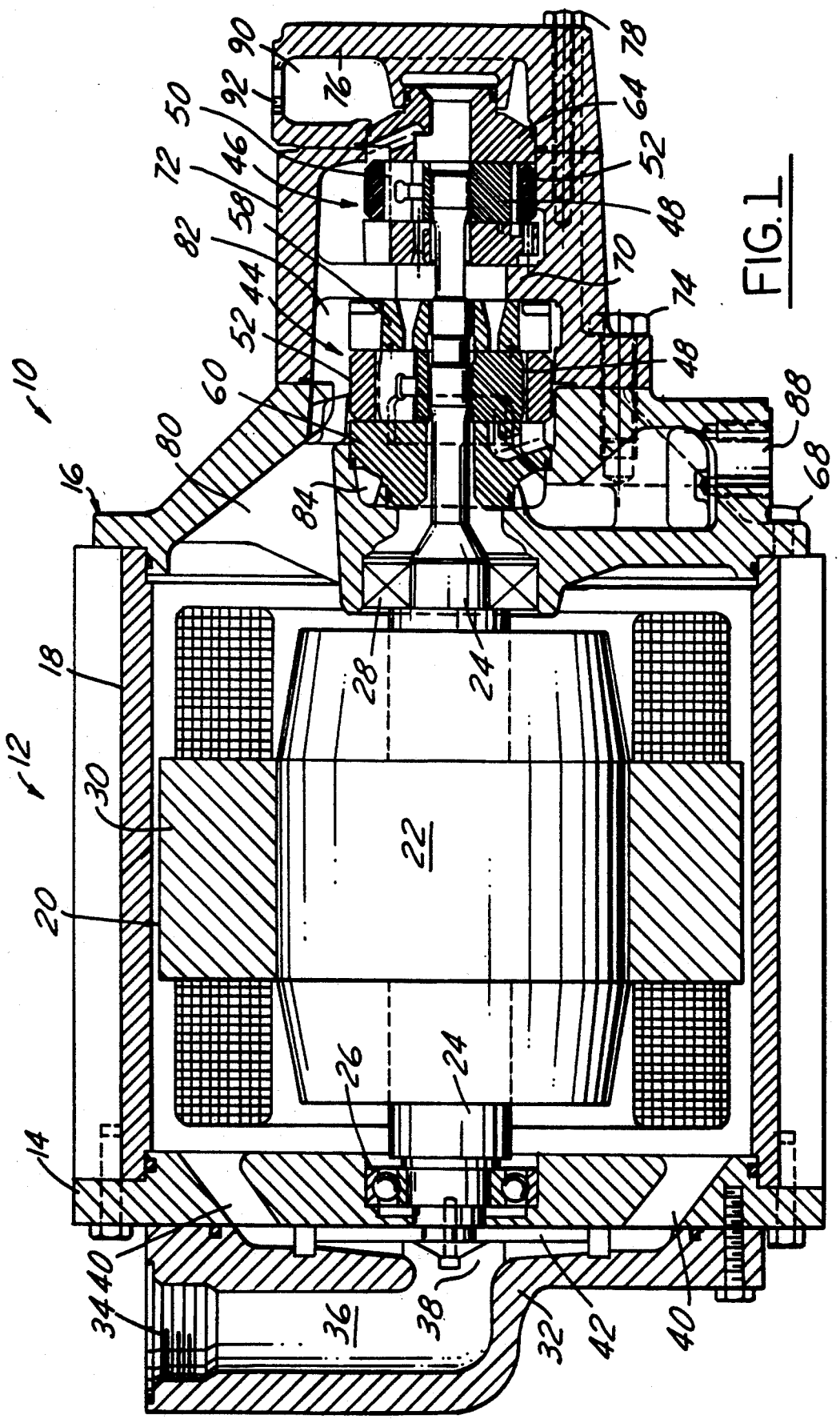
FIG. 1 is a longitudinal sectional view of an integrated electric motor/hydraulic pump in accordance with a presently preferred embodiment of the invention.
Figure 2:
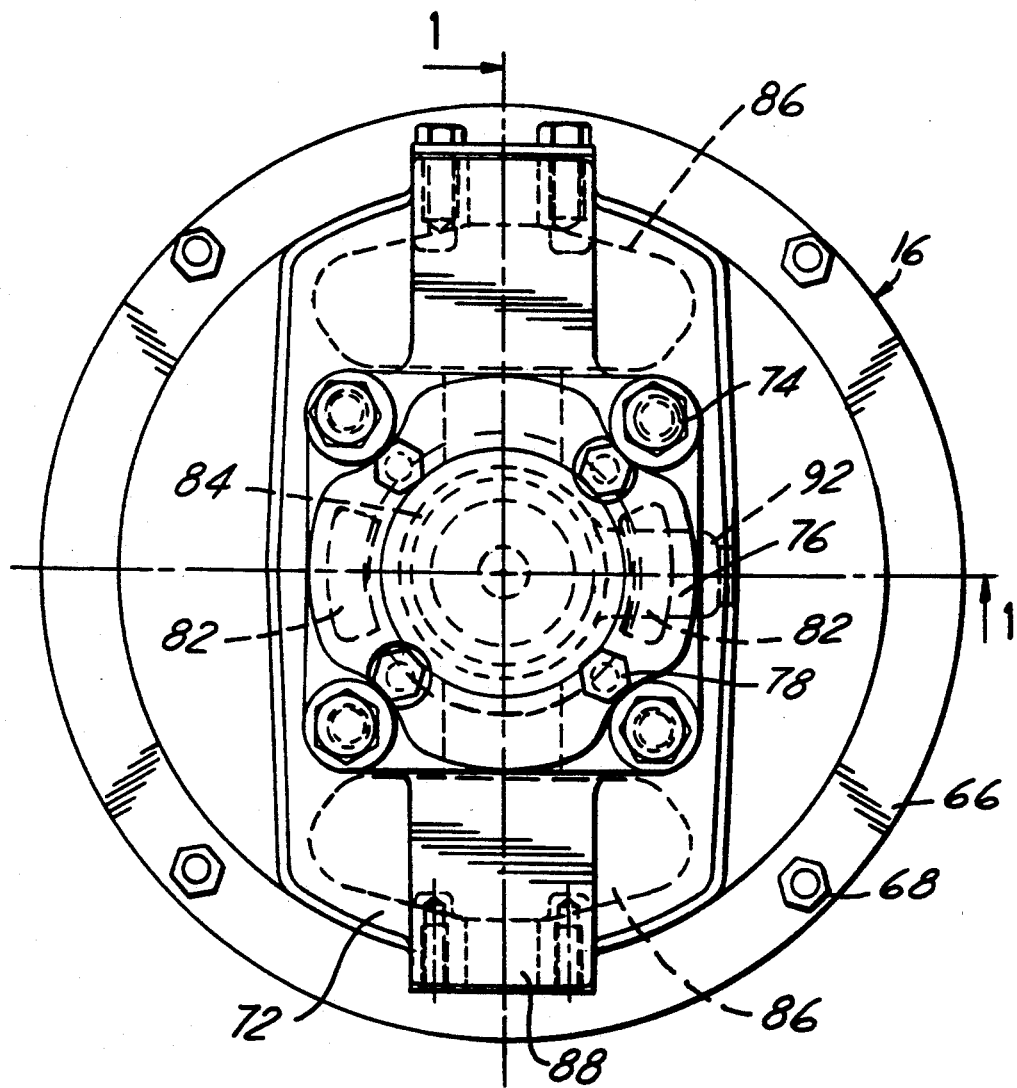
FIG. 2 is an end elevational view of the pump in FIG. 1, FIG. 1 being taken substantially along the line 1—1 in FIG. 2.
Figure 3:
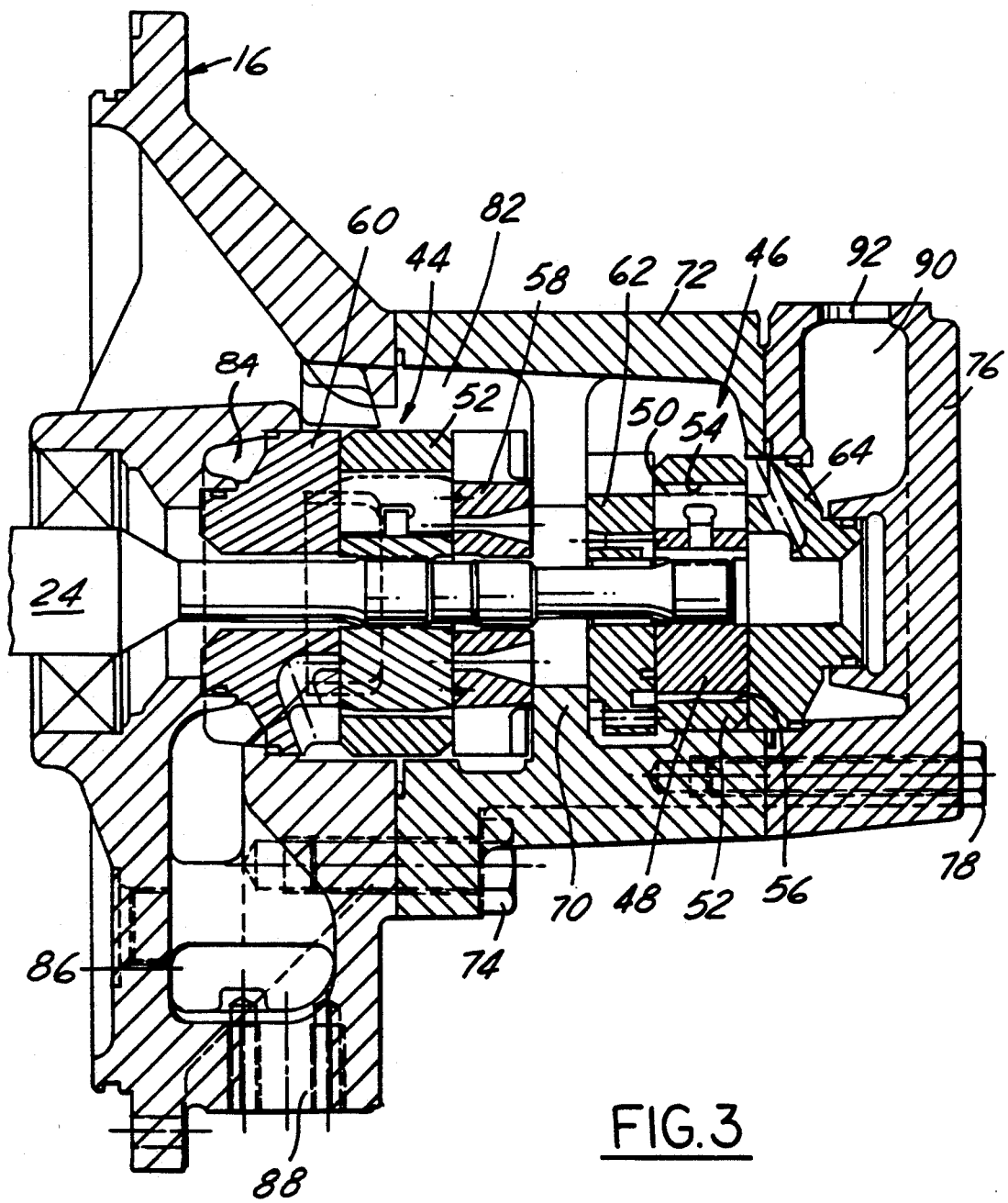
FIG. 3 is a fragmentary sectional view on an enlarged scale of the end member with two vane pump cartridges in the pump of FIG. 1.

FIGS. 1-3 illustrate an integrated in-line electric motor/hydraulic vane pump assembly 10 as comprising a housing 12 formed by a pair of end members or caps 14,16 interconnected by a case 18. An electric motor 20 has a rotor 22 mounted on a shaft 24 that is rotatably journalled at opposed ends by roller bearings 26,28 carried by end members 14,16 respectively. A stator 30 surrounds rotor 22 within housing 12 for connection to a source of electrical power (not shown) to rotate rotor 22 and shaft 24 about their common axis. An inlet housing 32 is mounted on end member 14, and has a radially oriented fluid inlet opening 34 connected by an internal passage 36 to a central cavity 38 opposed to end member 14. Cavity 38 is connected by a circumferential array of passages 40 in end member 14 to the interior of housing 12, through which the fluid flows around and through the rotor and stator components toward opposing end member 16. A fluid impeller 42 is coupled to shaft 24 within cavity 38 for boosting inlet fluid pressure fed to the interior of the pump housing.

A pair of vane pump subassemblies or cartridges 44,46 are respectively integrated within end member 16, housing 72 and cover 76. Vane pump cartridges are shown, for example in U.S. Pat. Nos. 2,967,488 and 4,505,654. Each cartridge 44,46 includes a rotor 48 rotatably coupled to shaft 24 by interlocking splines. A plurality of vanes 50 are radially slidably disposed in associated slots within each rotor 48. A cam ring 52 surrounds each rotor 48 for sliding engagement by vanes 50, and cooperates with the associated rotor to define diametrically opposed arcuate pumping cavities 54,56 between each rotor and the associated cam ring. Each pump cartridge thus comprises a so-called dual lobe vane pump cartridge. Cartridge 44 includes a support plate 58 disposed adjacent to housing wall 70 on one side of rotor 48, and a pressure plate 60 disposed on the opposing side of the rotor. Likewise, cartridge 46 includes a support plate 62 and an opposing pressure plate 64. Plates 58,60,62 and 64 thus cooperate with the cam rings to define the chamber in which the rotors and vanes rotate, and include diametrically opposed arcuate kidney-shaped inlet and outlet ports opening into the respective pumping cavities. Vane pump cartridge 44 is sandwiched and captured within end member 16 and housing 72, which is fastened by screws 74. End member 16 is fastened to case 18 by screws 68. In the same way, cartridge 46 is captured and sandwiched within pump housing 72 and cover 76, which is fastened by screws 78. The wall 70 in housing 72 separates cartridges 44,46. Pressure plates 60,64 carry suitable seals for engaging bores within end member 16 and cap 76 respectively.

Figure 3A:
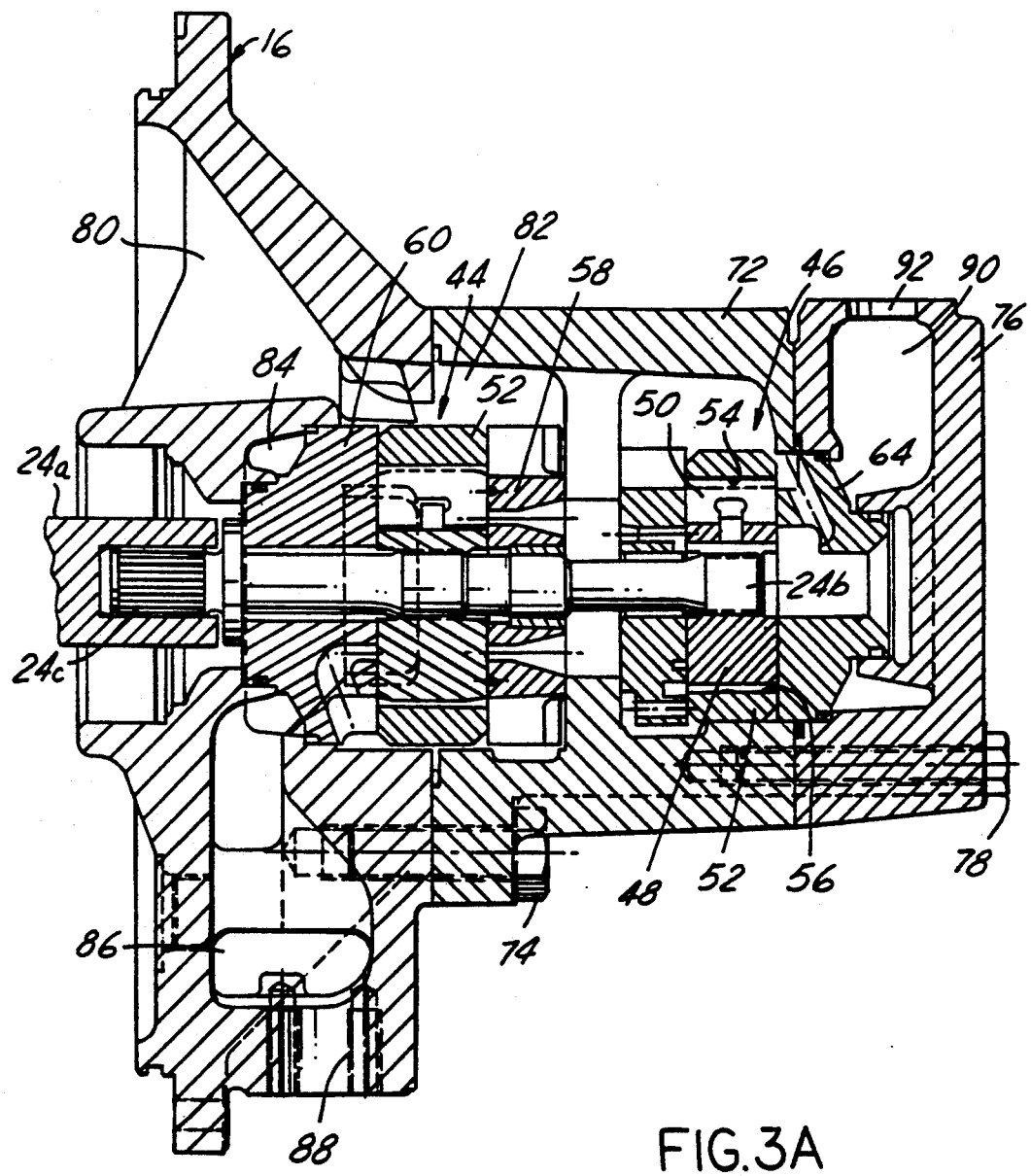
FIG. 3A is a view showing a modification to FIG. 3.

A pair of diametrically opposed inlet chambers 80 are formed in end member 16. Each inlet chamber 80 opens into the interior of housing 12, and provides a large mass of relatively quiescent fluid. A passage 82 in pump housing 72 extends through wall 70 to connect the filling chambers surrounding cartridges 44,46. This interior is connected to the pump cavities by the inlet ports in plates 58,60,62 and 64, and by passages in plates 58,62 to chambers in rotors 48 beneath vanes 50. Inlet fluid is thus fed by passage 82 from chamber 80 to both cartridges 44,46 in parallel, independently of each other, and without any couplings or connections external to the housing. The discharge ports in pressure plate 60 of cartridge 44 are connected by passages 84 to two enlarged volume chambers 86 within end member 16. An outlet opening 88 is coupled to chamber 86 for directing fluid to external devices (not shown). Similarly, the discharge ports in pressure plate 64 are connected to an outlet chamber 90 in cover 76, and thence to a radial opening 92 for connection to external devices (not shown). Chambers 86,90 function to dampen pressure pulsations in the discharge fluid. Thus, the two vane pump cartridges 44,46 provide separate pump discharges parallel to and independent of each other. FIG. 3A shows a modification to FIG. 3 in which the unitary motor/pump shaft 24 is replaced by a motor shaft 24a and a pump shaft 24b interconnected by interlocking splines 24c.

Figure 4:
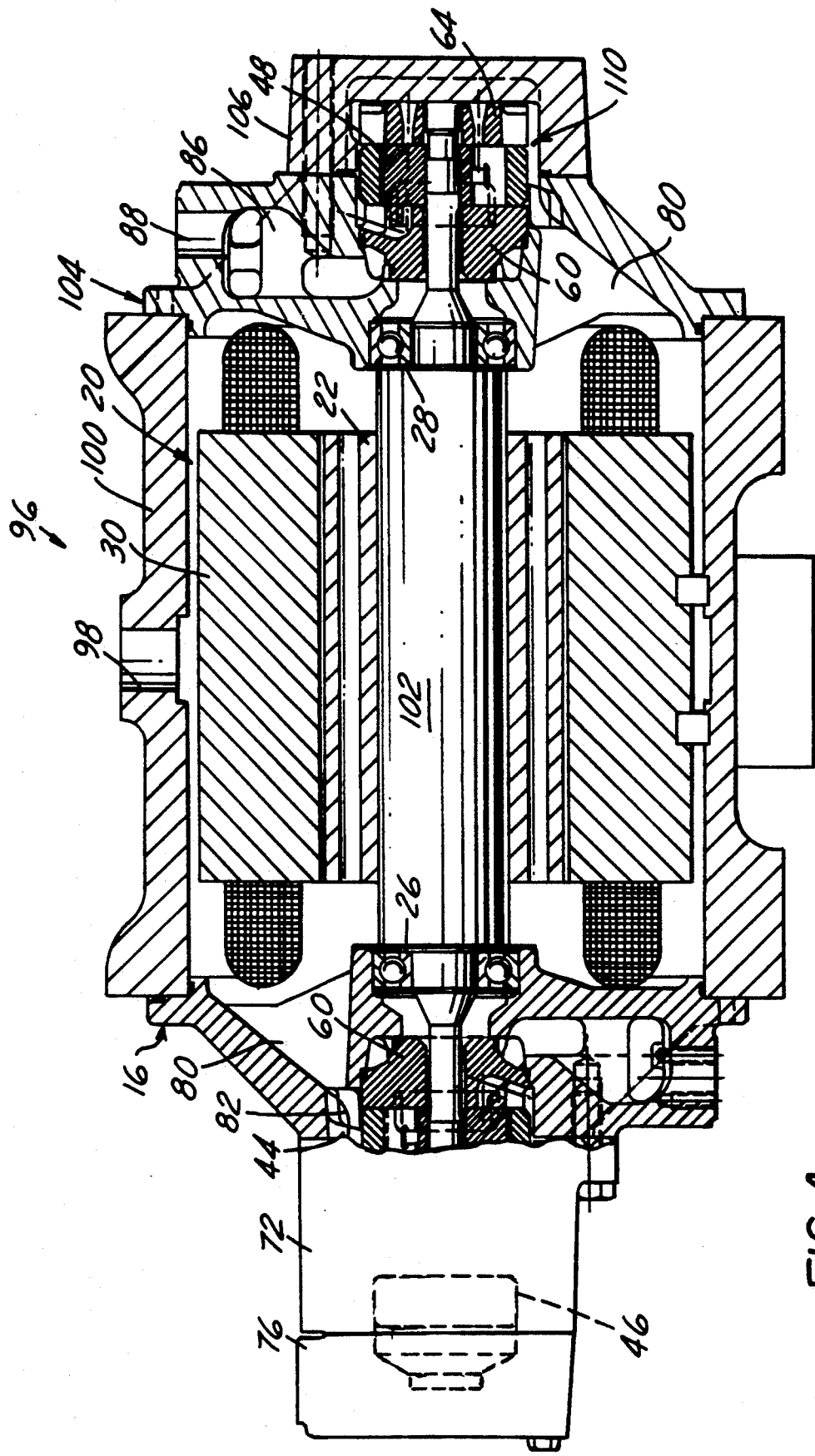
FIG. 4 is a partially sectioned view of an integrated electric motor/hydraulic pump in accordance with a second embodiment of the invention.
Figure 5:
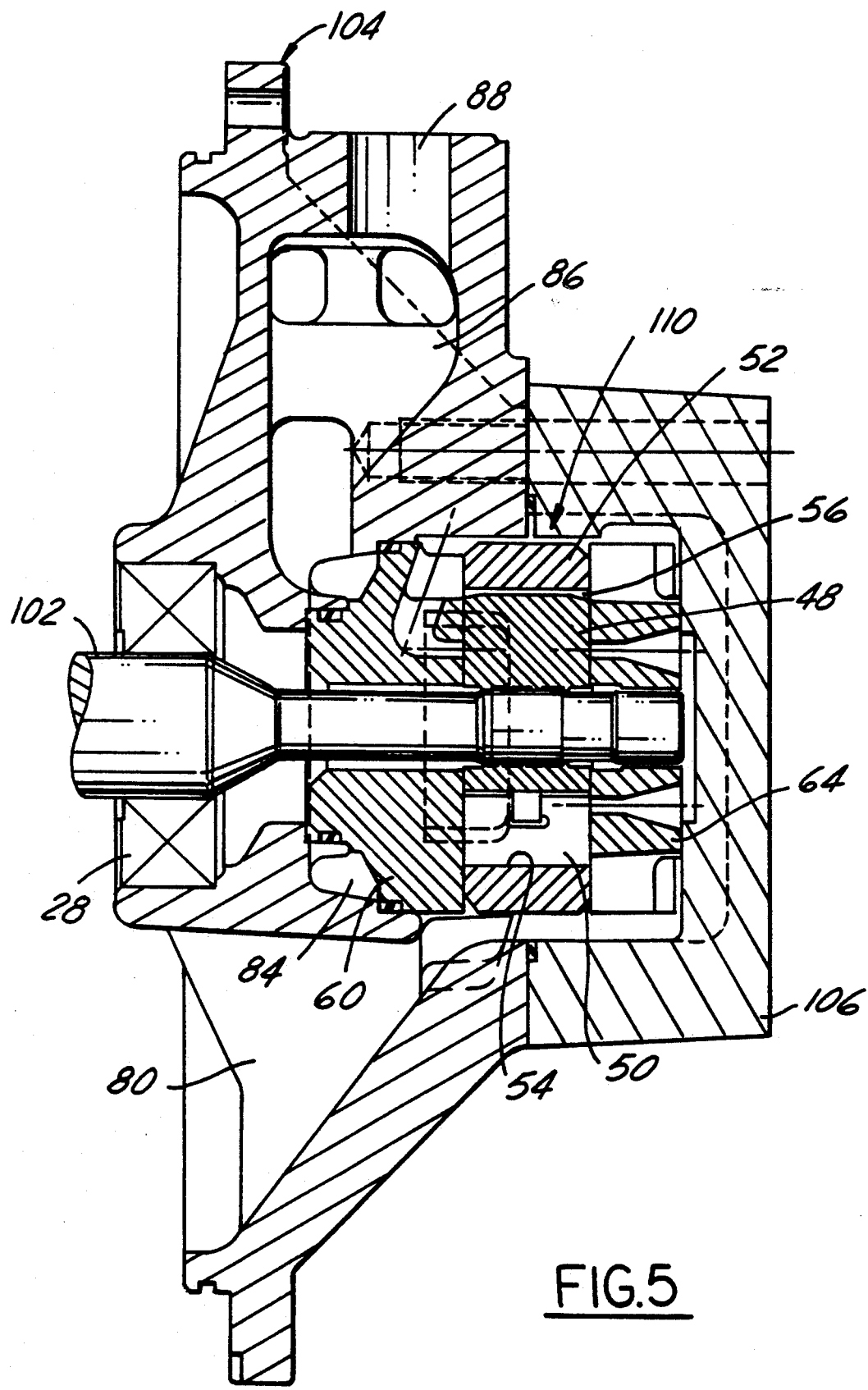
FIG. 5 is a fragmentary sectional view on an enlarged scale of the second end member and vane pump cartridge in the embodiment of FIG. 4.

FIGS. 4 and 5 illustrate a modified integrated pump 96 in which the pump inlet is provided by a radial opening 98 in housing case 100 for feeding inlet fluid directly into the interior of the housing. End member 16, pump housing 72, cover 76 and cartridges 44,46 (as in FIGS. 1-3) are mounted on one end of case 100 and operatively coupled to the motor/pump drive shaft 102. A vane pump cartridge 110 is located within the end member 104 and captured by cover 106. Pump cartridge 110 is generally the same as cartridges 44,46 described in detail hereinabove, having a rotor 48 coupled by internesting splines to the end of shaft 102 remote from cartridges 44,46. An inlet chamber 80 is formed in end member 104 and connects to radially opposed inlet ports in cartridge 110. Radially opposed outlet ports in cartridge 110 connect to a discharge chambers 86 in end member 104, and thence through a radial opening 88 to suitable external devices. Thus, in the embodiment of FIGS. 4 and 5, vane pump cartridges are mounted within each end member for providing independent discharges to external devices. As a modification to the embodiment of FIGS. 4-5, a pair of vane pump cartridges may be coupled to both ends of the shaft.

We claim:

1. An integrated in-line electric motor/hydraulic pump that comprises:

a housing having an open interior and a pair of end members mounted at opposed ends thereof, an electric motor including a rotor on a shaft journalled between said end members within said open interior of said housing and a stator surrounding said rotor also within said open interior of said housing, pump inlet means opening into the interior of said housing for receiving and directing hydraulic fluid through said open interior of said housing around said rotor and stator of said motor within said open interior, first and second separate and independent vane pump cartridge means within one of said end members, each including a rotor coupled to said shaft coaxially with said motor with a plurality of vanes carried by said rotor, a vane cam ring surrounding said rotor to define at least one pump cavity between said cam ring and said rotor, and a pair of said plates with inlet and discharge ports opening into the associated at least one pump cavity, vane pump inlet passage means within said one end member extending between and operatively coupling said housing interior to the said at least one pump cavity of each said first and second vane pump cartridge means for drawing hydraulic fluid from said pump inlet means through said open interior of said housing around said rotor and stator of said motor and feeding such fluid to said pump cavities in parallel, and vane pump discharge passage means within said one end member and operatively coupled separately to said pump cavities.

2. The pump set forth in claim 1 wherein said vane pump inlet passage means includes an enlarged inlet chamber formed by a pocket in said one end member that opens directly into said housing interior to provide a large mass of relatively quiescent fluid at said inlet passage means, an inlet port at each said pump cavity, and a passage within said one end member connecting said inlet chamber pocket to each said inlet port in parallel.

3. The pump set forth in claim 1 wherein said one end member comprises a first member fastened to said housing, a second member fastened to said first member and having an internal wall, said first vane pump cartridge means being captured between said first member and said internal wall and said inlet passage means extending through said first member and said internal wall, and a third member fastened to said second member with said second vane pump cartridge means being captured therebetween.

4. The pump set forth in claim 1 wherein each of said vane pump cartridge means comprises a dual lobe vane pump cartridge in which the associated cam ring and rotor define diametrically opposed pump cavities therebetween, said inlet and discharge passage means opening into each said cavity.

5. The pump set forth in claim 1 wherein said discharge passage means comprises first and second pump discharge passages in said one end member respectively coupled to said first and second vane pump cartridge means independently of each other.

6. The pump set forth in claim 1 wherein said pump inlet means is disposed in the other of said end members.

7. The pump set forth in claim 6 wherein said pump inlet means including third pump means in said other end member and coupled to said shaft for boosting pressure of fluid flowing from said inlet means into said open interior of said housing.

8. The pump set forth in claim 7 wherein said third pump means comprises an impeller.

9. The pump set forth in claim 1 further comprising at least a third vane pump cartridge means within the other of said end members, vane pump inlet passage means in said other end member operatively coupling said housing interior to said third vane pump cartridge means for drawing hydraulic fluid from said pump inlet means through said open interior of said housing around said rotor and stator of said motor and feeding said fluid to said third vane pump cartridge means, and vane pump discharge passage means within said other end member separate from the discharge passage means for said first and second vane pump cartridge means and operatively coupled to said third vane pump cartridge means.

10. The pump set forth in claim 1 wherein said shaft comprises a unitary shaft extending from said motor through said end member to said pump rotors.

11. The pump set forth in claim 1 wherein said shaft comprises a first shaft coupled to said motor, a second shaft carried by said end member and coupled to said pump rotors, and means interconnecting said first and second shafts.

12. An integrated in-line electric motor/hydraulic pump that comprises:

a housing having a pair of end members mounted at opposed ends thereof, an electric motor including a rotor on a shaft journalled between said end members and a stator surrounding said rotor within said housing, pump inlet means opening into the interior of said housing, first and second vane pump cartridge means within one of said end member, each including a rotor coupled to said shaft with a plurality of vanes carried by said rotor and a vane cam ring surrounding said rotor to define at least one pumping cavity between said cam ring and said rotor, vane pump inlet passage means within said one end member extending between and operatively coupling said housing interior to the said at least one pump cavity of each said first and second vane pump cartridge means for feeding fluid from said interior to said pump cavities in parallel, and vane pump discharge passage means within said one end member and operatively coupled separately to said pumping cavities, said one end member comprising a first member fastened to said housing, a second member fastened to said first member and having an internal wall, said first vane pump cartridge means being captured between said first member and said internal wall and said inlet passage means extending through said first member and said internal wall, and a third member fastened to said second member with said second vane pump cartridge means being captured therebetween.

13. The pump set forth in claim 12 wherein each of said vane pump cartridge means includes a pair of side plates with inlet and discharge ports opening into the associated at least one pump cavity.

14. The pump set forth in claim 13 wherein each of said vane pump cartridge means comprises a dual lobe vane pump cartridge in which the associated cam ring and rotor define diametrically opposed pump cavities therebetween, said inlet and discharge ports opening into each said cavity.

15. The pump set forth in claim 12 wherein said discharge passage means comprises first and second pump discharge passages in said one end member respectively coupled to said first and second vane pump cartridge means independently of each other.

16. The pump set forth in claim 15 wherein said first pump discharge passage is carried by said first member and said second pump discharge passage is carried by said third member.

17. The pump set forth in claim 12 wherein said discharge passage means includes at least one enlarged volume chamber within said end member for damping discharge fluid pressure pulsations.

18. The pump set forth in claim 12 wherein said shaft is of unitary construction that extends through said first and second members and is directly coupled to both said rotors.

* * * * *